United States Patent [19]
Graton et al.

[11] Patent Number: 5,279,398
[45] Date of Patent: Jan. 18, 1994

[54] TORSION DAMPING DEVICE FOR TORQUE TRANSMISSION APPARATUS

[75] Inventors: Michel Graton, Paris; Fabrice Tauvron, Creteil, both of France

[73] Assignee: Valeo, Paris, France

[21] Appl. No.: 964,893

[22] Filed: Oct. 22, 1992

[30] Foreign Application Priority Data

Oct. 25, 1991 [FR] France .................. 91 13214

[51] Int. Cl.⁵ ............................... F16D 3/66
[52] U.S. Cl. .................. 192/3.29; 192/106.2; 464/64; 464/68
[58] Field of Search ........ 192/3.28, 3.29, 3.3, 192/106.2; 464/64, 67, 68

[56] References Cited

U.S. PATENT DOCUMENTS

| | | | |
|---|---|---|---|
| 4,347,717 | 9/1982 | Lamarche | 464/64 |
| 4,422,535 | 12/1983 | Ling | 192/106.2 X |
| 4,559,024 | 12/1985 | Tamura et al. | 464/64 X |
| 4,637,500 | 1/1987 | Gobel et al. | 192/106.2 X |
| 4,716,998 | 1/1988 | Tsukamoto et al. | 192/3.3 |
| 4,987,980 | 1/1991 | Fujimoto | 192/3.28 |
| 5,020,647 | 6/1991 | Fujimoto et al. | 192/3.29 |
| 5,080,215 | 1/1992 | Förster et al. | 192/106.2 |
| 5,119,911 | 6/1992 | Bochot et al. | 192/3.29 |
| 5,139,122 | 8/1992 | Maeda et al. | 192/3.29 |
| 5,174,423 | 12/1992 | Tsukamoto et al. | 192/3.29 |

FOREIGN PATENT DOCUMENTS

| | | |
|---|---|---|
| 3240238 | 5/1983 | Fed. Rep. of Germany . |
| 3934798 | 4/1991 | Fed. Rep. of Germany . |
| 2568638 | 2/1986 | France . |
| 2620187 | 3/1989 | France . |
| 2-225861 | 9/1990 | Japan .................. 192/3.29 |
| 2-248751 | 10/1990 | Japan .................. 192/3.29 |
| 2045367 | 10/1980 | United Kingdom . |
| 2066414 | 7/1981 | United Kingdom . |
| 2098702 | 11/1982 | United Kingdom . |
| 2255153 | 10/1992 | United Kingdom . |

*Primary Examiner*—Richard M. Lorence
*Assistant Examiner*—Andrea Pitts
*Attorney, Agent, or Firm*—Longacre & White

[57] ABSTRACT

A torsion damping device, for example for a motor vehicle fluid transmission, includes a first pair of guide rings, a second pair of guide rings fixed to a torque input element, a first hub fixed to a second pair of guide rings, a second hub, a first series of springs coupling the first pair of guide rings to the first hub, a second series of springs coupling the second pair of guide rings to the second hub, and an abutment member for limiting the relative angular displacement between the first pair of guide rings and the first hub. The first pair of guide rings is fastened to the torque input element by fastening members. These fastening members and the abutment member are both located radially inwardly of one of the two series of springs, and radially outwardly of the other series.

13 Claims, 3 Drawing Sheets

5,279,398

TORSION DAMPING DEVICE FOR TORQUE TRANSMISSION APPARATUS

FIELD OF THE INVENTION

This invention relates to torque transmission apparatus of the kind having a driving element, a driven element, and a torsion damping device coupling the driven element to the driving element.

In particular, the invention is concerned with a torsion damping device for a torque transmission apparatus, in particular for a motor vehicle, for transmitting torque between a driving element and a driven element, in which the torsion damping device comprises: a torque input element adapted to be connected to the driving element; a torque output element adapted to be connected to the driven element; a first pair of guide rings disposed at the outer periphery of the torsion damping device and secured to the torque input element; a second pair of guide rings disposed at the inner periphery of the torsion damping device; a first hub disposed between the first pair of guide rings and fixed with respect to the second pair of guide rings; a second hub disposed between the second pair of guide rings and configured in such a way as to be coupled to the torque output element for rotation therewith; a first series of resilient members coupling the first pair of guide rings to the first hub; a second series of resilient members coupling the second pair of guide rings to the second hub; and abutment means for limiting relative angular displacement between the first pair of guide rings and the first hub.

BACKGROUND OF THE INVENTION

A torsion damping device as described in the last preceding paragraph is described in the specification of French published patent application No. FR 2 568 638A, in which the damping device is part of a hydrokinetic torque transmitting apparatus in the form of a torque converter. In that arrangement, the torque input element consists of one of the rings of the first pair of guide rings, which is externally fixed to the wall of the torque converter casing, while the torque output element consists of the second hub, the latter being mounted on a driven shaft for rotation of the latter with it.

Such a device presents certain problems, since the abutment means are located at the outer periphery of the damping device, so that the resilient members of the first series cannot be extended circumferentially to as great an extent as is desirable. In addition, the guide ring which constitutes the torque input element has a peripheral fastening flange which is somewhat large in the axial direction. This increases the axial size of the torsion damping device, and prevents resilient members of large circumferential length from being used for the first series of resilient members.

DISCUSSION OF THE INVENTION

An object of the present invention is to overcome the above drawbacks in a simple and inexpensive manner.

According to the present invention, a torsion damping device of the particular kind set forth under "Field of the Invention" above is characterised in that the first pair of guide rings is coupled to the torque input element by fastening means located radially between the first series of resilient members and the second series of resilient members, and in that the abutment means are located radially between the first series of resilient members and the second series of resilient members.

The invention makes it possible to use for the first series of resilient members very long circumferentially extending springs. It also provides a simple way of obtaining a large angular displacement, in more than one stage of movement, between the torque input element and the torque output element, without having to use floating spacers in the manner described in the specification of French published patent application No. FR 2 568 638A.

The springs or other resilient members of the second series can be relatively short, of the kind used in a conventional torsion damper. In addition, the axial size of the device is reduced, and it is also robust.

According to a preferred feature of the invention, the hubs are inclined at their outer periphery, with the first hub being divergent at its outer periphery away from a transverse portion of the torque input element, while the second hub is convergent at its outer periphery towards this transverse portion. The guide rings are configured accordingly. Under these circumstances, the axial size of the torsion damping device is able to be reduced still further. This arrangement is of particular advantage when the torque input element constitutes the piston of a locking clutch associated with a hydrokinetic apparatus, such as a torque converter or fluid coupling.

Another advantage is that the torsion damper can easily be accommodated between one of the walls of the casing and the turbine wheel of the hydrokinetic torque transmitting apparatus.

According to a further preferred feature of the invention, the first pair of guide rings is so configured as to grip the first hub at its inner periphery, while the second pair of guide rings similarly grips the second hub. Thus in operation, the required frictional effects are produced in a very simple manner. In addition, the number of components is reduced, as is the axial size of the torsion damping device itself.

According to yet another feature of the invention, the abutment means are defined by lugs of the first hub, which are adapted to interfere with a portion, oriented in a generally axial direction, which is carried internally by one of the guide rings of the first pair of guide rings.

The first hub may be made integral with the second pair of guide rings, the latter for this purpose being abutted together and secured radially outwardly of the second hub. Alternatively the first hub may be a separate component from the second pair of guide rings. In that case, the first hub and the second pair of guide rings are provided with suitable lugs for securing them together.

The description of preferred embodiments of the invention which follows is given by way of example only and with reference to the accompanying drawings.

DESCRIPTION OF PREFERRED EMBODIMENTS OF THE INVENTION

Figure 1:
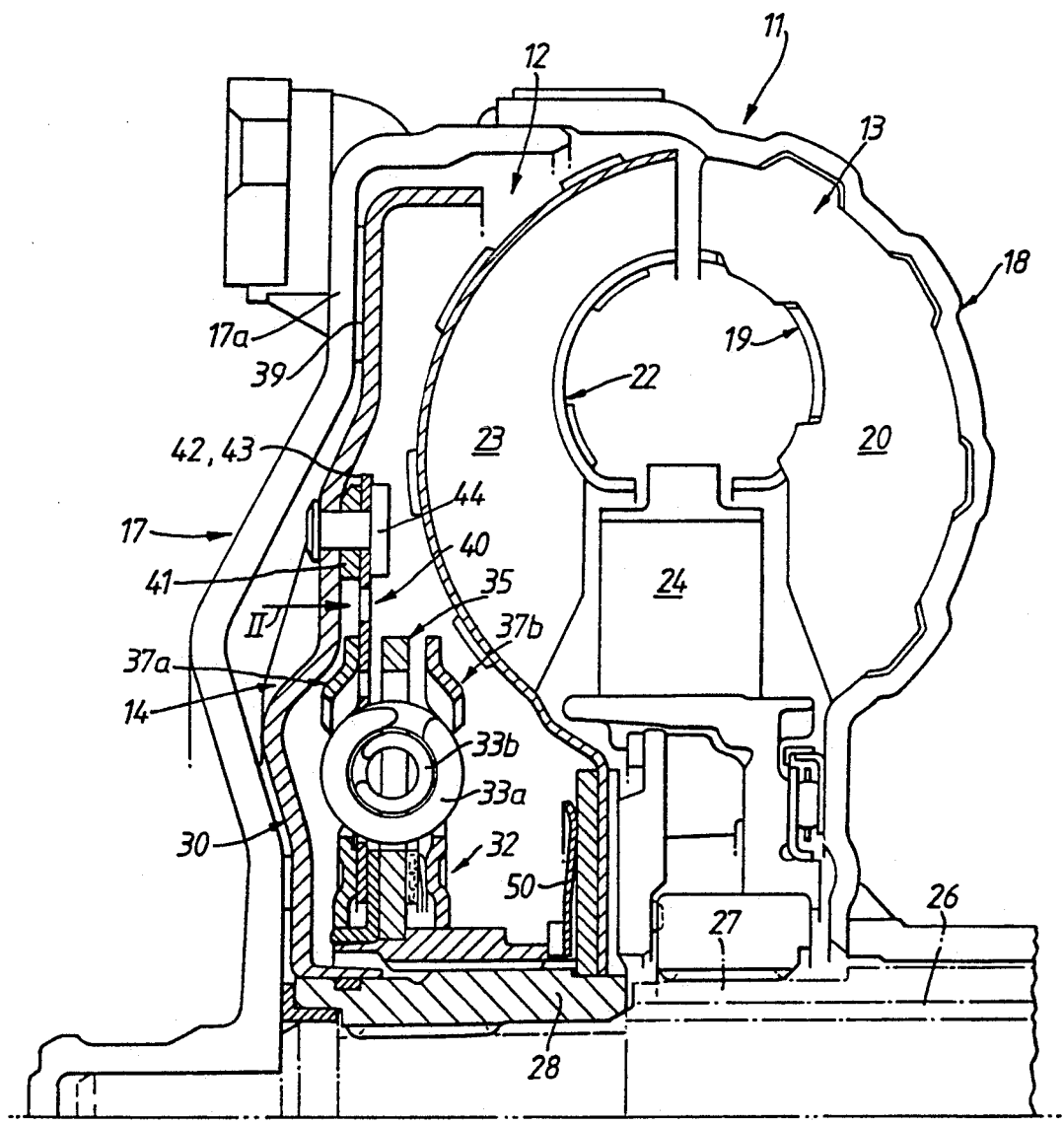
FIG. 1 is a diagrammatic half view, seen to one side of the axis of rotation, and in cross section, showing a hydrokinetic or fluid coupling apparatus of the kind disclosed in the specification of French patent application No. 90 12946 (which had not yet been published at the time of preparing the present specification).

In the drawings, the torsion damping device consists of a locking clutch mounted in a hydrokinetic or fluid coupling apparatus.

The prior art arrangement shown in FIG. 1 will first be described, and reference is here invited to the specifications of U.S. Pat. No. 5,119,911 and French published patent application No. FR 2 668 234A. A hydrokinetic coupling apparatus 11 includes a torque converter 13 and a locking clutch 14, arranged within a common sealed casing 12 defining an oil chamber. The casing or chamber 12 constitutes a driving element, and is arranged to be coupled in rotation to the crankshaft of an internal combustion engine, being for example secured to a diaphragm which is fixed with respect to the crankshaft in the manner described in the specification of published United Kingdom patent application No. GB 2 045 367A.

The casing 12 comprises a first shell member 17 and an annular second shell member 18, which is arranged in facing relationship with the first shell member 17 and which is so configured as to define an impulse wheel 19. The first shell member 17 includes a flat, radially extending, annular transverse portion 17a, which is adapted to cooperate with the locking clutch 14. The wheel 19 is formed with lobes 20 which are fixed with respect to the internal face of the second shell member 18. The two shell members 17 and 18 are joined together in a sealing manner at their outer periphery, in this example by welding.

The remainder of the torque converter comprises a turbine wheel 22, which is provided with lobes 23 in facing relationship with the lobes 20 of the wheel 19, together with a reaction wheel 24. The turbine wheel 22 is coupled in rotation to a driving shaft by means of a hub 28, which constitutes a driving element and which is coupled to the said shaft by a splined connection, while the reaction wheel is secured to a sleeve 27. In this example, the wheel 22 is fixed with respect to the hub 28, while a spring 50 bears directly on the wheel 22 and biasses a torsion damping device, or torsion damper, 32 towards the shell member 17 of the casing.

The locking clutch 14 includes a coupling element, or torque input element, 30, in the form of a piston which is mounted for axial sliding movement through a cylindrical central portion on the outer surface of the hub 28, so that the latter acts as a bearing for the piston 30. The torsion damper 32 is itself a part of the locking clutch 14.

The torsion damper 32 is arranged at the inner periphery of the apparatus, and includes a series of resilient members, which typically consist of pairs of helical springs 33a, 33b. Its main components comprise a central hub 35 which acts as a torque output element and which is secured to the hub 28, for rotation with the latter, by means of a splined coupling; and a pair of guide rings 37a and 37b which extend on either side of the hub 35 of the torsion damper. The springs 33a and 33b couple the pair of guide rings 37a and 37b to the central hub 35, the latter having a radial damper plate. For this purpose the springs 33a and 33b are fitted in recesses defined by windows, which are formed in facing relationship with each other in the damper plate of the hub 35 and in the guide rings themselves, all in the conventional way.

The piston 30 has a flat, annular friction liner 39 which is arranged to come into contact with the internal face of the flat annular portion, or wall, 17a. The pair of guide rings 37a and 37b are coupled to the piston 30 by means of a thin web or plate 40, which is secured by means of rivets 44 to the piston 30, with a spacer 41 being interposed. The plate 40 is secured by riveting to the guide ring 37a, against which it is abutted.

It will be recalled that the turbine wheel 22 is driven by the impulse wheel 19 by virtue of the flow of fluid contained within the casing 12, and that the coupling element 30 couples the driven shaft and the driving shaft together in common rotation. Thus when the piston 30 comes into contact with the wall 17a of the casing through its liner 39 and under the effect of a hydraulic control pressure, the resulting frictional locking effect causes the turbine wheel, which is coupled to the driven shaft such as the input shaft of the gearbox, to be driven directly by the casing 12, with the latter being coupled to the crankshaft of the engine for rotation with it.

In the apparatus as described so far, the relative angular displacement between the piston 30 and the torsion damper hub 35 is relatively restricted. The torsion dampers, in accordance with the invention, which will be described below, incorporate a plurality of resilient members working in series, in order to increase this displacement.

Figure 3:
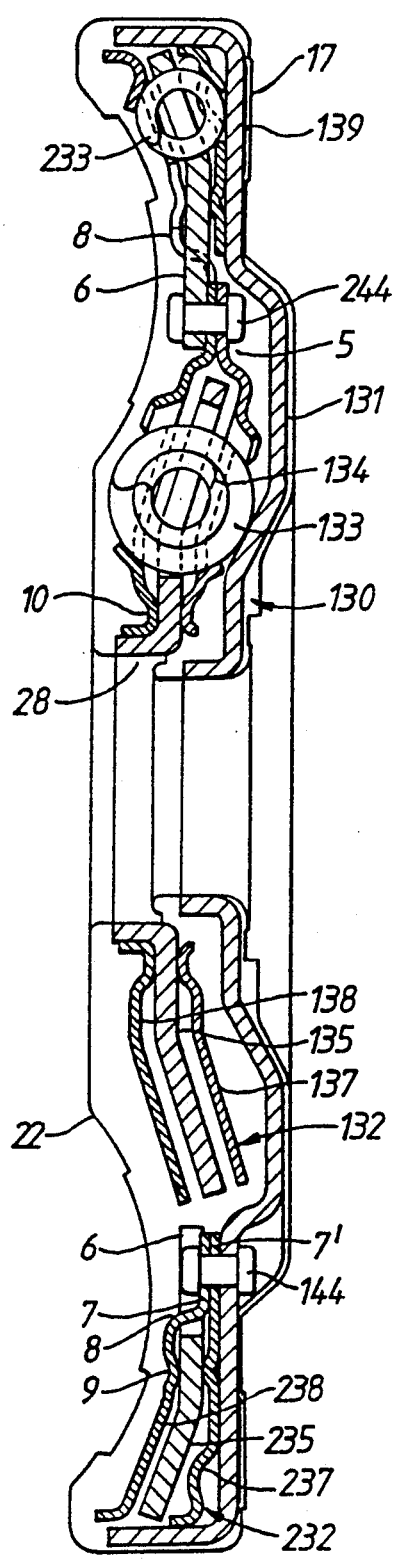
FIG. 3 is a view in cross section taken on the line 3—3 in FIG. 2, with the fluid coupling apparatus being indicated diagrammatically.
Figure 4:
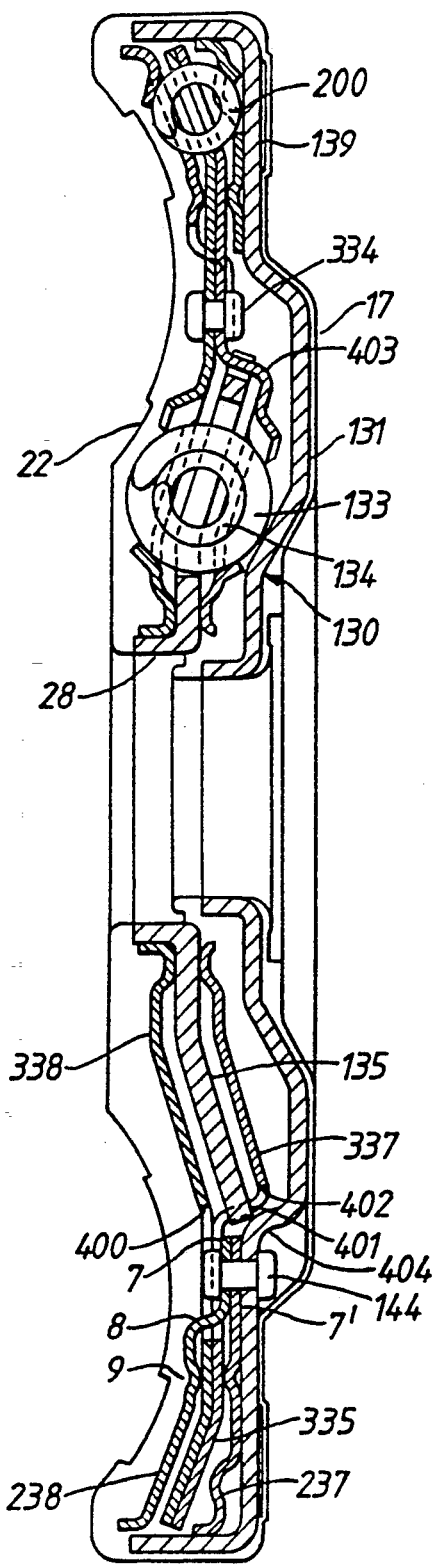
FIG. 4 is a view similar to FIG. 3, showing another embodiment of the invention.

In the remainder of this description, the hydrokinetic coupling apparatus will be treated in a simplified manner, and in this connection FIGS. 3 and 4 show the shell member 17, turbine wheel 22 and hub 28 in outline only.

Figure 2:
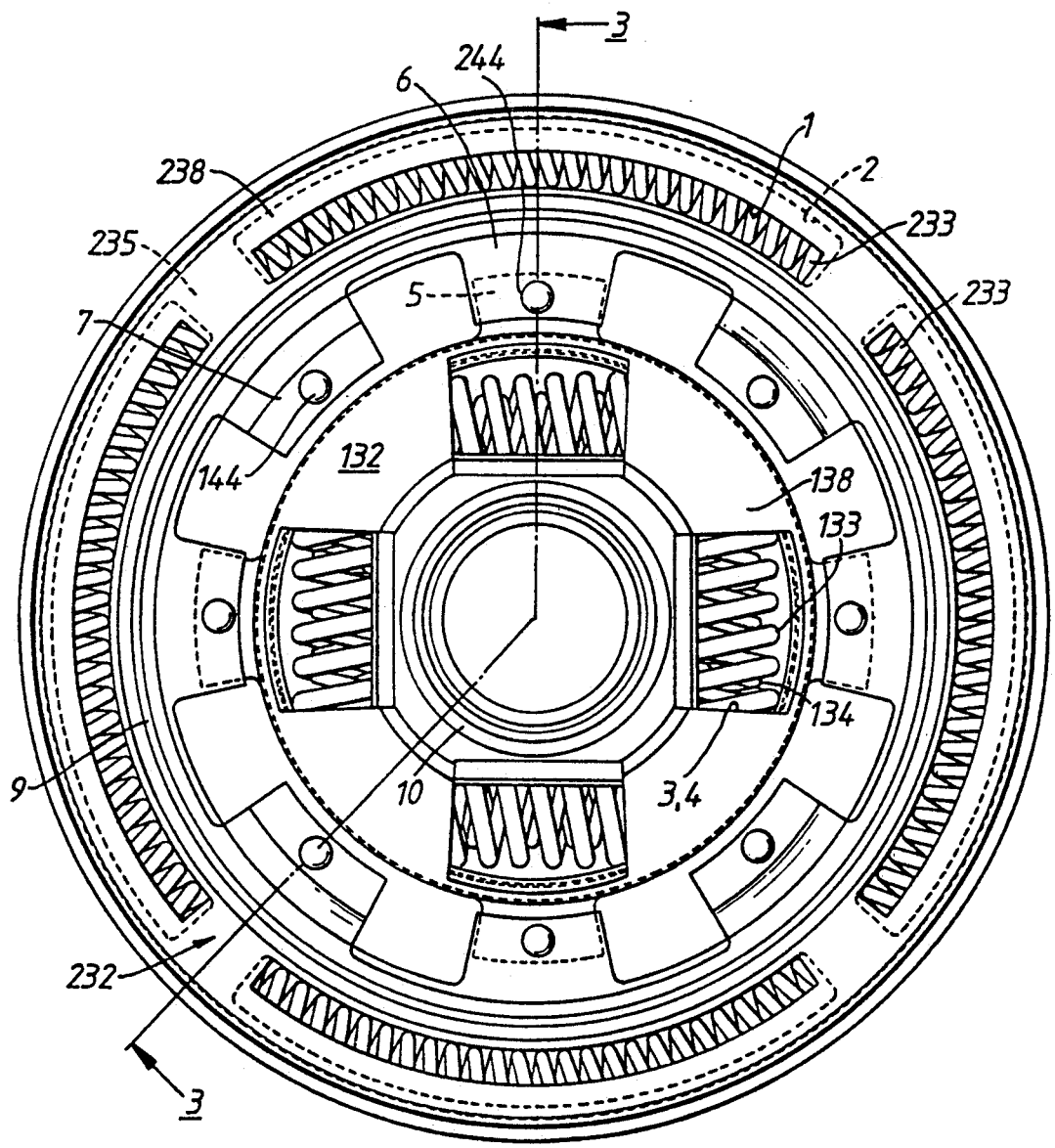
FIG. 2 is a view in elevation of a torsion damping apparatus in accordance with the present invention.

With reference therefore to FIGS. 2 and 3, these show a torsion damping device for a torque transmission apparatus, in particular for a motor vehicle. The torque is transmitted between a driving element 12 (FIG. 1) and a driven element 28, and the torsion damping device or torsion damper comprises the following: a torque input element 130; a torque output element 135; a first pair of guide rings 237 and 238; a second pair of guide rings 137 and 138; a first hub 235; a second hub 135; a first series of resilient members 233; a second series of resilient members 133, 134; and abutment means 6, 8. The torsion damper consists essentially of an outer part 232 including the components 130, 233, 235, 237, 238; and an inner part 132 that includes the components 133, 134, 135, 137 and 138.

In greater detail, the torque input element 130 is adapted to be connected to the driving element 12, while the torque output element 135 is adapted to be connected to the driven element 28. The first pair of guide rings 237 and 238 are arranged in the outer part of the torsion damper and are fixed to the torque input element 130. The second pair of guide rings 137 and 138 are disposed in the inner part of the torsion damping device. The first hub 235 is arranged between the first pair of guide rings 237, 238 and is fixed to the second pair of guide rings 137 and 138, while the second hub 135 is arranged between these guide rings 137 and 138. This second hub 135 is, in general terms, so configured that it rotates with the torque output element 135. As to the two series of resilient members, the first series 233 couples the first pair of guide rings 237, 238 to the first hub 235, while the second series 133, 134 couples the second pair of guide rings 137 and 138 to the second hub 135. Finally, the abutment means 6, 8 limit the relative angular displacement between the first pair of guide rings 237, 238 and the first hub 235.

The first pair of guide rings 237, 238 is fastened to the torque input element 130 by fastening means 144, which here extend axially and are located in a radial position between the first series of resilient members 233 and the second series of resilient members 133, 134. In addition, the abutment means 6, 8 are located in a radial position between the first series of resilient members 233 and the second series of resilient members 133, 134. Thus the fastening means 144 and the abutment means 6, 8 are radially inward of one series, and outward of the other series, of resilient members.

In operation (with reference to all of FIGS. 1 to 3), the piston 130 is coupled through its friction liner 139 to the wall 17a for rotation with it, under the effect of the hydraulic control pressure that exists between the turbine wheel 22 and the piston 130. The torque is transmitted from the wall 17a to the piston 130, and thence to the guide rings 237 and 238 through the fastening means 144. From the guide rings 237, 238, the torque is transmitted to the first hub 235 and to the second pair of guide rings 137 and 138, via the first resilient members 233, being finally passed from the rings 137, 138 to the second hub 135 through the second resilient members 133 and 134.

It will thus be seen that the resilient members 233, 133, 134 work in series. In FIGS. 2 to 4 these resilient members are in the form of coil springs. The springs 233 of the first series are mounted without clearance in windows 1 which are formed in the guide rings 237 and 238, being mounted with a circumferential clearance in further windows 2 which are formed in the first hub 235. In this example the hub 235 is in the form of a radial plate. The windows 1 and 2 are arranged in facing relationship with each other, with the windows 2 being slightly longer in the circumferential direction than the windows 1, as can be seen in FIG. 2.

Also as is best seen in FIG. 2, the springs 233 are very long in the circumferential direction. In this example there are four of these springs 233, and they are arranged on a pitch circle close to the outer periphery of the piston 130, with each spring defining an arc of that circle.

It should be noted that it is because of the fastening means 144 and their location that the springs 233 are able to be located on a large circumference. In the present example the fastening means 144 consist of rivets, and for this purpose each of the guide rings 237, 238 has at its inner periphery a set of radial fastening lugs 7', 7 which are directed radially inwards, towards the axis of the assembly. The outer periphery of each of these guide rings is formed with an annular stiffening flange which is directed away from the transverse portion of the piston 130. These flanges, which are orientated axially, are short in length.

In order to constitute the abutment means, the guide ring 238, i.e. that one of the pair which is furthest away from the piston 130, has at its inner periphery, radially outward of the springs 233, a set of axial hip portions 8. Each axial hip portion 8 is joined to a corresponding one of the fastening lugs 7. The rivets 144 abut against, and extend through, the fastening lugs 7' and 7 of the guide rings 237 and 238, so as to give a strong fastening of the guide rings to the piston 130. The guide ring 238 is thus able to be made with a reduced axial size, with its lugs 7 being in contact with the lugs 7' of the other guide ring 237, the latter being in contact with the piston 130.

Preferably the guide rings 237 and 238, like the second pair of guide rings 137 and 138, are of metal and are made by pressing. Fastening of the guide rings 237 and 238 to the annular piston 130 can of course be achieved by welding the lugs 7 to the piston 130, or in a further modification by means of screw fastenings or bolts.

The axial hip portions 8 are spaced apart at regular intervals on a common pitch circle, as are the fastening lugs 7 and 7', and define a spacing means between the two guide rings 237 and 238, passing through the plane of the first hub 235 radially inwardly of the inner periphery of the latter. These hip portions 8 are arranged to cooperate with a set of radial abutment lugs 6 which are formed at the inner periphery of the hub 235. The abutment lugs 6 of the hub 235, directed towards the axis of the assembly, are penetrated by the rivets 244, which also pass through a set of further radial lugs 5. These lugs 5 are directed away from the axis of the assembly, and are formed at the outer periphery of the guide rings 137 and 138. The abutment lugs 6 thus also act as fastening lugs whereby the hub 235 is fastened by riveting to the lugs 5. Like the latter, the lugs 6 are spaced apart at regular intervals on a common pitch circle, and alternate with the hip portions 8 and the fastening lugs 7, 7'. The lugs 5 are abutted together and extend radially generally inwards of the second hub 135, being formed by pressing the guide rings 137 and 138 inwardly.

It will be understood that in place of the rivets 244, it is of course possible to use screw fastenings, bolts or welding of the lugs 6 to the lugs 5.

As can be seen in FIG. 2, the rivets 144 alternate circumferentially with the rivets 244, being located generally radially on a common circumference of the assembly. The same is also true for the various lugs 5, 6, 7 and 7', which are located radially between the first series 233 and the second series 133, 134 of resilient members. This second series of springs consists, in this example, of coil springs mounted without clearance in windows 3 which are formed in the guide rings 137 and 138, and in windows 4 which are formed in facing relationship to the windows 3 in the second hub 135, the latter being generally in the form of a radial plate. In the present example these windows 3 and 4 have the same circumferential size as each other, while the springs 133 and 134 consist of four pairs of springs, in which the springs 134 are mounted inside the springs 133.

It will be appreciated that the lugs 5 are located radially outwardly of the windows 3 and 4, which enables the second or inner part 132 of the torsion damping device to be provided, this part including the guide rings 137, 138 and the hub 135, which are of high mechanical strength. Similarly, the guide rings 237 and 238 and hub 235 of the first or outer part 232 of the damper are also of high mechanical strength.

The available space is thus used to the best advantage. In this connection, the first hub 235 and the second hub 135 generally comprise plate elements which are mounted one radially outwardly of the other, each plate element having at its inner periphery a generally flat transverse portion, and, at its outer periphery, an inclined portion in which the windows 2 and 4 are formed. The inclined portion of the plate element 235 is spaced away from the transverse portion of the shell member 17 (FIG. 1) of the casing, while the inclined portion of the plate element 135 is close to that transverse portion.

Also, each of the inner guide rings 137 and 138 has an inclined portion which is parallel to the inclined portion of the plate element 135. The outer guide ring 238 also has an inclined portion which is parallel to that of the plate element 235. The guide ring 237 is adjacent to the piston 130 and extends generally transversely in order to reduce the axial size of the assembly.

The hubs or plate elements 235 and 135 are thus provided with respective inclined portions, the inclinations of which are opposed to each other. The same is true for the guide rings 137 and 138 and the ring 238.

It will be noted that the piston 130, like the first shell member 17 of the casing, has a deformed central portion 131, which defines an axial offset with respect to the main portion of the piston 130 that is mounted for axial sliding movement on the hub 28. In practice, the portion 131 is formed by pressing, and it enables the rivets 144 and 244, and springs 133, 134 to be fitted. All of this enables a torsion damping device to be provided which is able to follow the shape of the turbine wheel 22 to the greatest possible extent, thus reducing the axial size of the damping device.

It will be noted that the plate element 135 has an axially oriented sleeve at its inner periphery. In this example this sleeve is integral with the plate element 135. The sleeve is splined internally, so that the element 135 is thereby coupled with the hub 28 for rotation with it, the hub 28 being partially splined externally for this purpose. The plate element 135 then constitutes the torque output element. In general terms therefore, the second hub is so shaped as to engage with the hub 28, the latter being the driven element.

Each pair of guide rings, arranged on either side of the appropriate hub, has at its inner periphery, radially inwardly of the corresponding resilient members, portions which are deformed locally towards the corresponding hub or plate element for frictional contact with the latter. In this example, these deformations are continuous. Thus the plate element 235 is gripped between the guide rings 237 and 238, being in contact with annular pressed beads 9 of the latter. Similarly, the plate element 135 is gripped by the guide rings 137 and 138, being in contact with pressed annular beads 10 of the latter. Each bead 9 is radially outward of the hip portions 8 of the guide ring 238, and therefore also radially outward of the fastening lugs 7 and 7'.

A flange, in the form of a sleeve portion, is formed on the inner periphery of the guide ring 138 (i.e. that one of the inner pair of guide rings that is furthest away from the piston 130). This sleeve portion is mounted on the outer periphery of the sleeve of the plate element 135, and therefore centres the guide ring 138 on the second hub 135.

As will be readily understood, and as will be clear from the above description and from the drawings, the arrangement whereby rivets, bolts or the like 144 and 244 are arranged in an alternate circumferential array prevents any interference occurring between the various components, and thus enables the size of the damping apparatus to be reduced. Similarly, the shape of the lugs 6, 7 and 7', which in this example is trapezoidal, enables the lugs to make good contact with each other. The circumferential distance between these various lugs depends on the application of the apparatus.

The present invention is of course not limited to the embodiment described above, but includes all practical variants. In particular, the input element may be defined by the half shell member 17 of the casing 12, the piston 130 being omitted.

With reference now to FIG. 4, in this modified embodiment the first hub, 335, which is again in radial plate form, is bifurcated, and is integral with the second pair of guide rings, here indicated by the reference numerals 337 and 338. To this end, these latter are abutted together at their outer periphery, and secured together by means of rivets 344 (or alternatively by means of screw fastenings, bolts, welding or the like). These rivets or the like 344 are located, like the rivets 244 in FIG. 3, on a common circumferential pitch circle with the rivets 144, with which they are arranged in circumferentially alternating positions. In the present case, the outer periphery of the second pair of guide rings 337 and 338 defining the plate element 335 is continuous, and is formed with windows 200 in which the springs 233 are fitted. These two guide rings 337 and 338 have a thickness which is substantially equal to that of the first plate element in FIG. 3.

In general terms, the plate elements or hubs are thicker than the guide rings, and are arranged axially between the corresponding guide rings.

It will be noted that the guide rings 337 and 338 are formed with aligned and circumferentially elongated slots 400 through which the rivets 144 pass, these slots being such as to prevent any interference occurring with the latter. The side edges of these slots are arranged to cooperate with the hip portions 8 of the guide ring 238, so as to define the abutment means discussed above and so as to limit the displacement between the first hub 337, 338 and the first pair of guide rings 237, 238.

It will be noted that in the embodiment shown in FIGS. 2 and 3, the springs 233 act differentially with respect to the springs 133, 134, and that they remain in their compressed state when the abutment means 6, 8 arrest the relative movement between the first rings and the first plate element by cooperation of the lugs 6 with the hip portions 8. On continuation of this movement, the springs 133, 134 continue to be compressed, by themselves. Thus the same characteristic curve is obtained as in the specification of French published patent application No. FR 2 568 638A, but in a more simple way. The movement is there limited by the turns of the springs 133 and 134 coming into interlocking engagement with each other.

In the variant shown in FIG. 4, this interlocking of the turns of the springs 133 and 134 is avoided by giving the second hub 135 a set of lugs or tabs 401, projecting radially from the outer periphery of the hub 135. These lugs 401 are arranged to interfere with the side edges of further slots 402, which are formed in an annular hip portion 403 in the outer periphery of the guide ring 337, beyond the hub 135. This hip portion acts as a spacer, and couples the guide ring 337 to the guide ring 338. Supplementary abutment means are thus created for finally limiting the angular displacement between the hub 135 and the guide rings 337, 338.

It will be noted that, as in FIG. 1, the piston 130 in FIG. 4 is formed with a local, pressed-out, zone 404 in its projecting deformed portion 131, so as to provide a seating for engagement of the fastening lug 7 of the guide ring 237, and to enable the rivets 144 to be accommodated.

The guide ring 237 of the first pair, adjacent to the piston 130 and following the profile of the latter, then has at its inner periphery an extension which is directed towards the axis of the assembly. This extension is then divided into lugs so as to prevent any interference with the rivets 334. In a modification, when the rivets 334 are located on a pitch circle of different diameter from that of the rivets 144, the said extension of the ring 237 may be continuous.

In a further modification, the torsion damping device in accordance with the invention may be fitted in a casing which is filled with a lubricating fluid. This device then acts directly between a driving shaft and a driven shaft, with the casing acting as the input element and the second hub acting as the output element.

The various resilient members may of course consist at least partly of blocks of a suitable resilient material.

The second hub may be in two parts, comprising a hub proper, serving as the output element and mounted for rotation on the hub 28, together with a radial plate which is disposed axially between the two associated guide rings, with loose coupling means (a meshing coupling which only comes into mesh after a clearance has been taken up) being interposed between the plate element and the hub. Optionally, suitable resilient means of low stiffness may also be interposed between the components. The plate element is then mounted in rotation, with a clearance, on the output element.

The lugs 7, 7', instead of being superimposed on each other, may be offset circumferentially, with each guide ring 237, 238 being then secured individually to the piston 130.

What is claimed is:

1. Torque transmission apparatus comprising a driving element, a driven element, and a torsion damping device interposed operatively between the driving element and the driven element, wherein the torsion damping device defines an outer periphery and an inner periphery thereof and comprises: a torque input element connected to said driving element; a torque output element connected to said driven element; a first pair of guide rings disposed at said outer periphery of the torsion damping device; a second pair of guide rings disposed at said inner periphery of the torsion damping device; a first hub; means mounting the first hub between the guide rings of said first pair for permitting movement in relative angular displacement between the first pair of guide rings and the first hub; means securing the first hub with respect to the second pair of guide rings; a first series of resilient members coupling the first pair of guide rings to the first hub; a second hub disposed between the guide rings of the said second pair of guide rings, the second hub being associated with said torque output element and configured so as to engage the torque output element whereby to drive the torque output element in rotation; a second series of resilient members coupling the second pair of guide rings to the second hub; fastening means located between said first series and second series of resilient members so as to be radially inward of one said series and radially outward of the other, said fastening means fastening the first pair of guide rings to the torque input element; and abutment means associated with the first pair of guide rings and the first hub, as well as being disposed radially inward of one said series of resilient members and radially outward of the other, whereby to limit said relative angular displacement between the first pair of guide rings and the first hub.

2. Apparatus according to claim 1, wherein the first pair of guide rings comprise a first guide ring and a second guide ring in which the first guide ring is closer than the second to the torque input element, the second guide ring having at its inner periphery, radially inward of the first series of resilient members, a plurality of substantially axial hip portions defining spacing means between said first and second guide rings, thereby defining part of the said abutment means.

3. Apparatus according to claim 2, wherein the second guide ring further includes a plurality of first fastening lugs, each of which is an extension, projecting on a generally radially inward direction, of a respective said hip portion, wherein said first guide ring has a plurality of second fastening lugs, with each said first fastening lug being superimposed on a corresponding second fastening lug, whereby the first and second guide rings are secured to the torque input element.

4. Apparatus according to claim 3, wherein said fastening means secure said first and second fastening lugs to the torque input element.

5. Apparatus according to claim 2, wherein said first hub has a plurality of abutment lugs extending generally radially inwardly from its inner periphery for cooperation with the said axial hip portions, whereby said abutment means comprise the abutment lugs and hip portions.

6. Apparatus according to claim 5, wherein the guide rings of said second pair of guide rings include a plurality of lugs extending generally radially outwardly, and further comprising means securing said lugs of the second pair of guide rings to the abutment lugs of the first hub.

7. Apparatus according to claim 2, wherein the guide rings of the second pair are abutted and secured together at their outer periphery, radially outwardly of the second series of resilient members, whereby the guide rings of the second pair integrally defined said first hub, the guide rings of the second pair including circumferentially elongated slots in alignment with each other, with said slots defining lateral edges for cooperation with said axial hip portions of the second guide ring, whereby said abutment means are defined by said lateral edges and hip portions.

8. Apparatus according to claim 1, wherein each of said first and second hubs has at its outer periphery an inclined portion inclined in different directions from one another, whereby the inclined portions of the first and second hubs are divergent and convergent respectively at their outer peripheries, with respect to the torque input element.

9. Apparatus according to claim 8, wherein the first pair of guide rings comprise a first guide ring and a second guide ring in which the first guide ring is closer than the second to the torque input element, the second guide ring including a further inclined portion, parallel to the inclined portion of the first hub, with the first guide ring extending in a generally radial direction adjacent to the torque input element.

10. Apparatus according to claim 8, wherein each guide ring of the second pair includes an inclined portion parallel to the inclined portion of the second hub.

11. Apparatus according to claim 1, wherein said fastening means comprise first rivets securing the guide rings of said first pair together to the torque input element, the torsion damping device further including a plurality of second rivets securing the first hub to the second pair of guide rings, with said first and second rivets being disposed alternately along a common pitch circle of the damping device.

12. Apparatus according to claim 1, wherein said fastening means comprise first rivets securing the guide rings of said first pair of guide rings together to the torque input element, the guide rings of said second pair being abutted together at their outer periphery to define together said first hub, the torsion damping device further including further rivets securing the guide rings of the second pair together, said further rivets being arranged alternately with said first rivets on a common pitch circle of the damping device.

13. Apparatus according to claim 1, further including a hydrokinetic apparatus having a casing defining a transverse face, the torque input element comprising a piston member and a friction liner carried by the piston member for cooperation with said transverse face of the casing, said driven element of the torque transmission apparatus compromising a driven hub, the piston having a main portion mounted for sliding movement on said driven hub, the piston having a central deformed portion defining an axial offset with respect to said main portion of the piston, and said second hub of the torsion damping device having an axially oriented sleeve at its inner periphery, defining internal splines coupling it in rotation with the driven hub, wherein the hydrokinetic apparatus further includes a turbine wheel, said central deformed portion of the piston of the torsion damping device being such as to permit the revilement member of said second series of revilement members to be mounted between said piston and turbine wheel.

* * * * *